United States Patent
Chavan et al.

(10) Patent No.: US 10,853,371 B2
(45) Date of Patent: Dec. 1, 2020

(54) EFFICIENT EVALUATION OF QUERY EXPRESSIONS INCLUDING GROUPING CLAUSES

(71) Applicant: Oracle International Corporation, Redwood Shores, CA (US)

(72) Inventors: Shasank K. Chavan, Menlo Park, CA (US); Dennis Lui, San Jose, CA (US); Allison L Holloway, San Carlos, CA (US); Sheldon A. K. Lewis, Jallisco (MX)

(73) Assignee: Oracle International Corporation, Redwood Shores, CA (US)

( * ) Notice: Subject to any disclaimer, the term of this patent is extended or adjusted under 35 U.S.C. 154(b) by 466 days.

(21) Appl. No.: 15/702,659

(22) Filed: Sep. 12, 2017

(65) Prior Publication Data

US 2018/0075096 A1 Mar. 15, 2018

Related U.S. Application Data

(60) Provisional application No. 62/393,181, filed on Sep. 12, 2016.

(51) Int. Cl.
*G06F 16/2455* (2019.01)
*G06F 16/22* (2019.01)
(Continued)

(52) U.S. Cl.
CPC ...... *G06F 16/24564* (2019.01); *G06F 16/221* (2019.01); *G06F 16/2237* (2019.01);
(Continued)

(58) Field of Classification Search
None
See application file for complete search history.

(56) References Cited

U.S. PATENT DOCUMENTS 8,892,586 B2 * 11/2014 Lemke ............. G06F 16/24553
707/758
9,251,210 B2 2/2016 Chaudhry et al.
(Continued)

OTHER PUBLICATIONS

KD Nuggets, "Apache Arrow and Apache Parquet: Why we Needed Different Projects for Columnar Data, on Disk and In-Memory", www.kdnuggets.com/2017/02/apache-arrow-parquet-columnar-data, Feb. 2017, 8pgs.

(Continued)

*Primary Examiner* — Amresh Singh
(74) *Attorney, Agent, or Firm* — Hickman Palermo Becker Bingham LLP

(57) ABSTRACT

Techniques related to efficient evaluation of query expressions including grouping clauses are disclosed. Computing device(s) perform a method for aggregating a measure column vector (MCV) according to a plurality of grouping column vectors (GCVs). The MCV and each of the plurality of GCVs may be encoded. The method includes determining a plurality of actual grouping keys (AGKs) and generating a dense identifier (DI) mapping that maps the plurality of AGKs to a plurality of DIs. Each AGK occurs in the plurality of GCVs. Each DI corresponds to a respective workspace. Aggregating the MCV involves aggregating, in each workspace, one or more codes of the MCV that correspond to an AGK mapped to a DI corresponding to the workspace. For a first row of the MCV and the plurality of GCVs, aggregating the one or more codes includes generating a particular grouping key based on codes in the plurality of GCVs.

20 Claims, 10 Drawing Sheets

(51) Int. Cl.
*G06F 16/2458* (2019.01)
*G06F 16/2453* (2019.01)
*G06F 9/30* (2018.01)
*G06F 9/38* (2018.01)

(52) U.S. Cl.
CPC ...... *G06F 16/2282* (2019.01); *G06F 16/2455* (2019.01); *G06F 16/2456* (2019.01); *G06F 16/2462* (2019.01); *G06F 16/24537* (2019.01); *G06F 9/30018* (2013.01); *G06F 9/30036* (2013.01); *G06F 9/3887* (2013.01)

(56) References Cited

U.S. PATENT DOCUMENTS

| | | | |
|---|---|---|---|
| 9,836,519 | B2 | 12/2017 | Kociubes et al. |
| 9,916,352 | B2 | 3/2018 | Chaudhry et al. |
| 2007/0174825 | A1 | 7/2007 | Eichenberger |
| 2009/0019017 | A1 | 1/2009 | Chaves |
| 2009/0249026 | A1 | 10/2009 | Smelyanskiy |
| 2012/0078880 | A1 | 3/2012 | Steven et al. |
| 2013/0151568 | A1* | 6/2013 | Ellison .................. G06F 9/3887 707/802 |
| 2014/0067789 | A1 | 3/2014 | Ahmed |
| 2014/0367789 | A1 | 3/2014 | Ahmed |
| 2015/0088926 | A1 | 3/2015 | Chavan |
| 2015/0089134 | A1 | 3/2015 | Mukherjee |
| 2016/0070726 | A1 | 3/2016 | Macnicol et al. |
| 2016/0147833 | A1 | 5/2016 | Chaudhry et al. |
| 2017/0017683 | A1 | 1/2017 | Fourny et al. |
| 2017/0060587 | A1 | 3/2017 | Chavan |
| 2019/0102412 | A1 | 4/2019 | Macnicol et al. |

OTHER PUBLICATIONS

Kemper, "Optimizing Disjunctive Queries with Expensive Predicates" dated 1994, pp. 336-347.
Christian Lemke et al., "Speeding Up Quries in Column Stores A Case for Compression", dated Sep. 2, 2010, 13 pages.
Chvan, U.S. Appl. No. 15/702,526, filed Sep. 12, 2017, Office Action, dated Aug. 30, 2019.
U.S. Appl. No. 14/033,271, filed Sep. 20, 2013.
Chavan, U.S. Appl. No. 15/702,431, filed Sep. 12, 2017, Notice of Allowance, dated Jun. 12, 2020.
Chavan, U.S. Appl. No. 15/702,526, filed Sep. 12, 2017, Notice of Allowance, dated May 21, 2020.

* cited by examiner

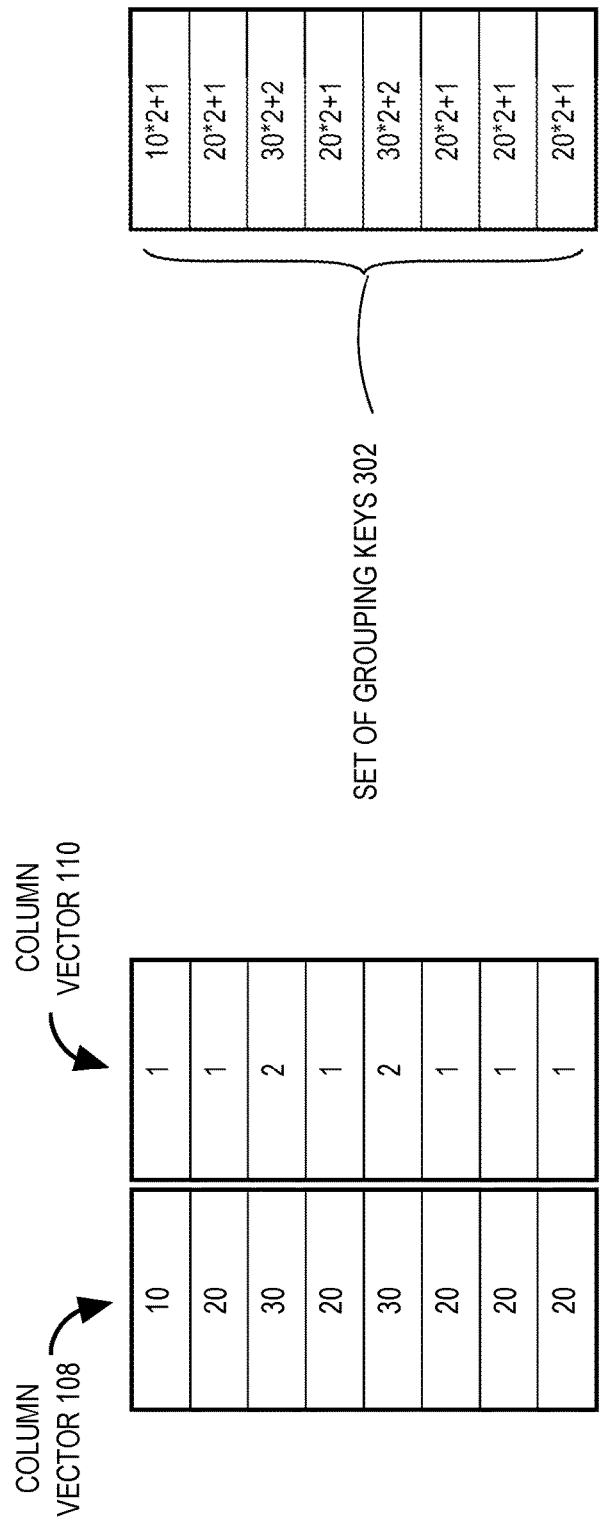
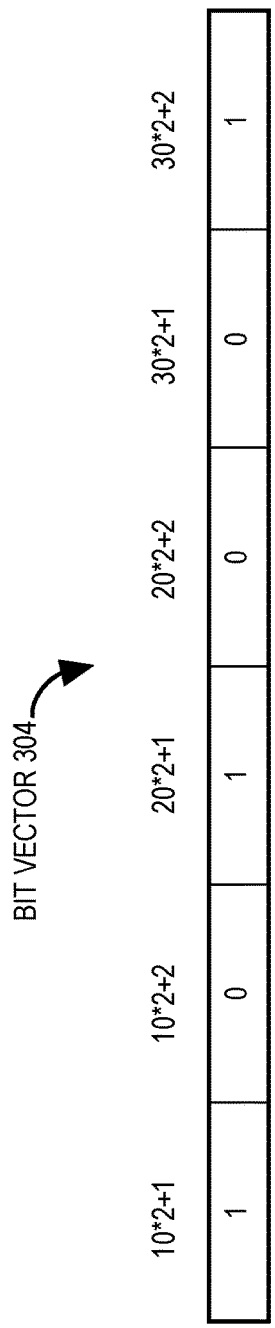

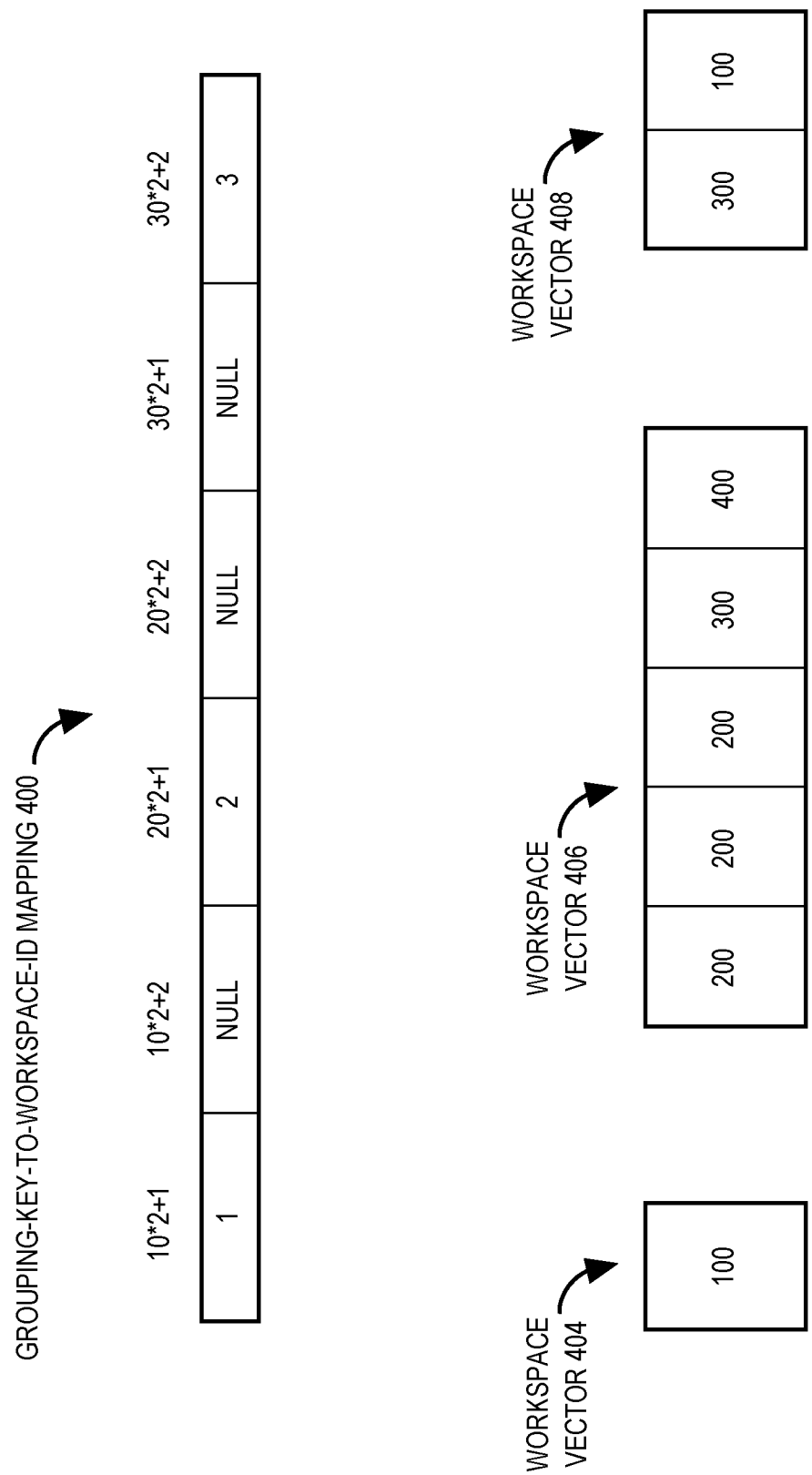

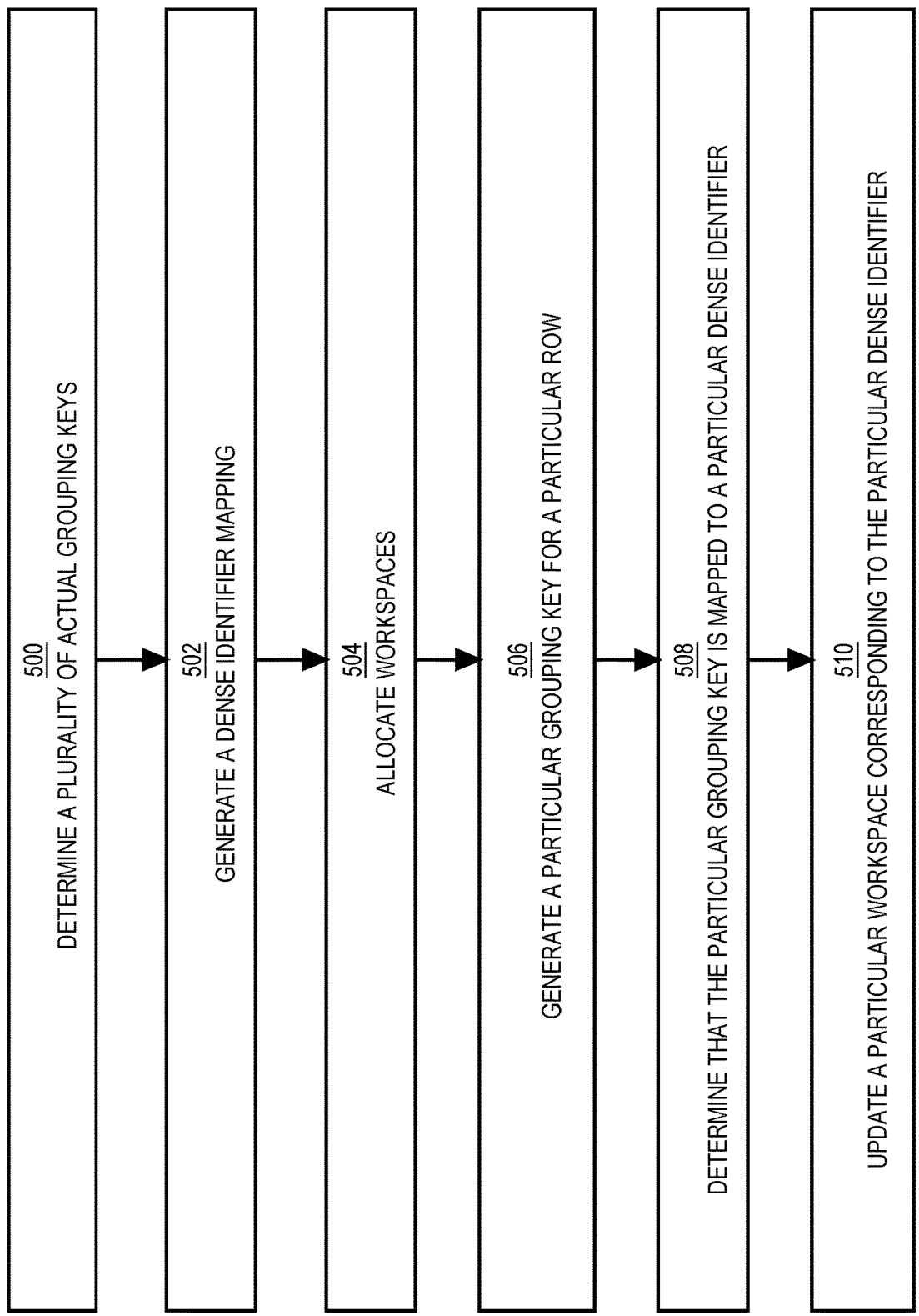

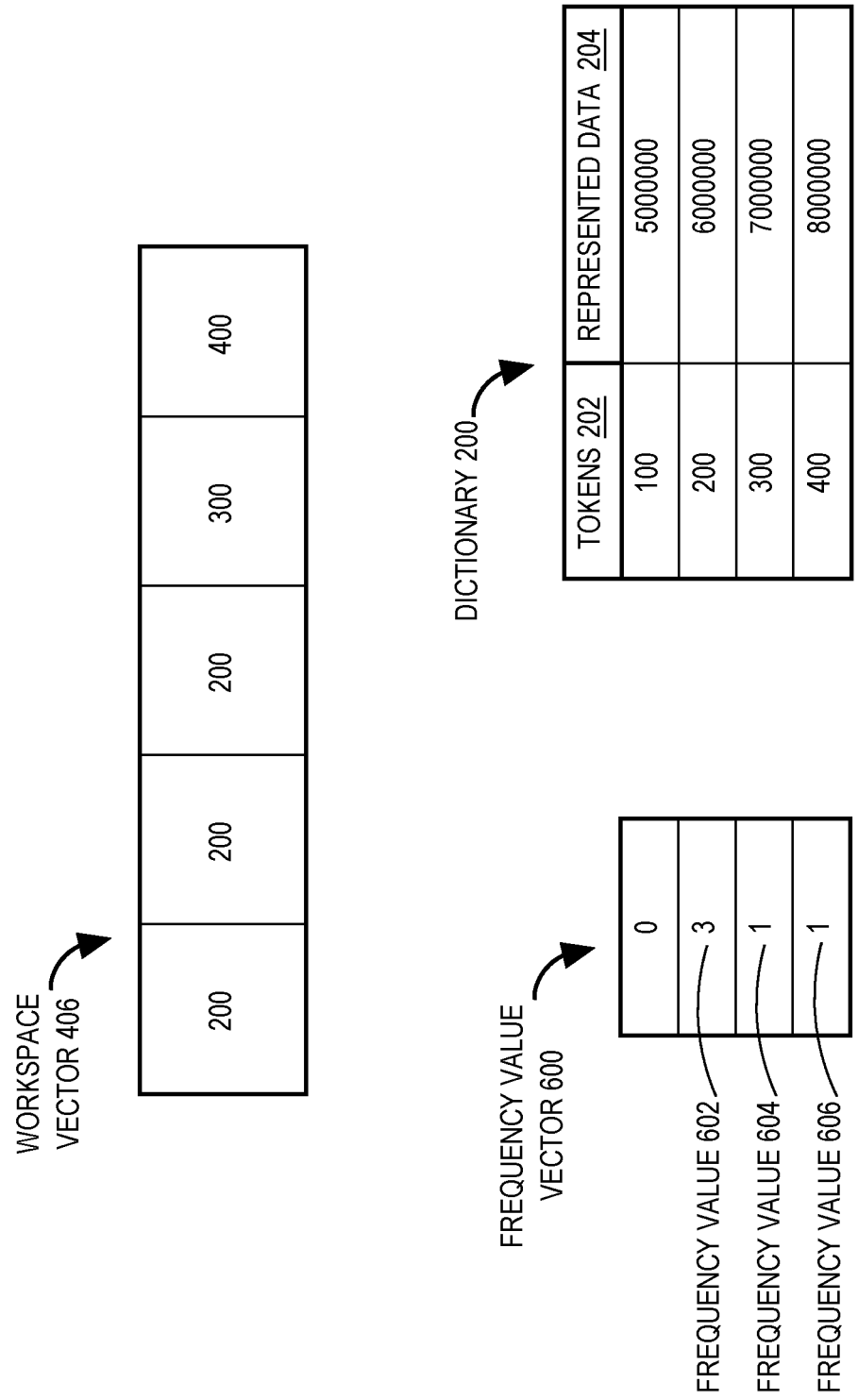

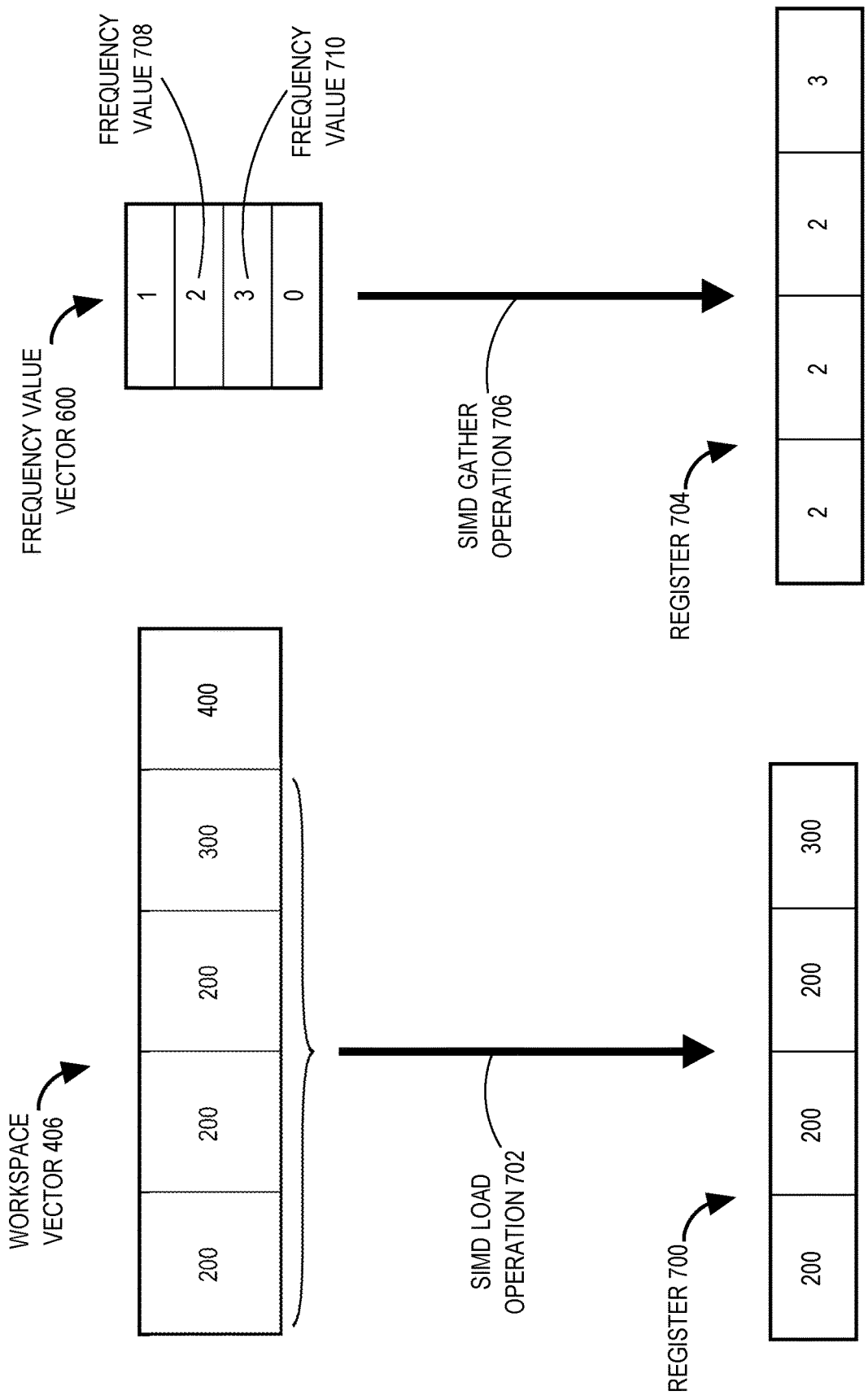

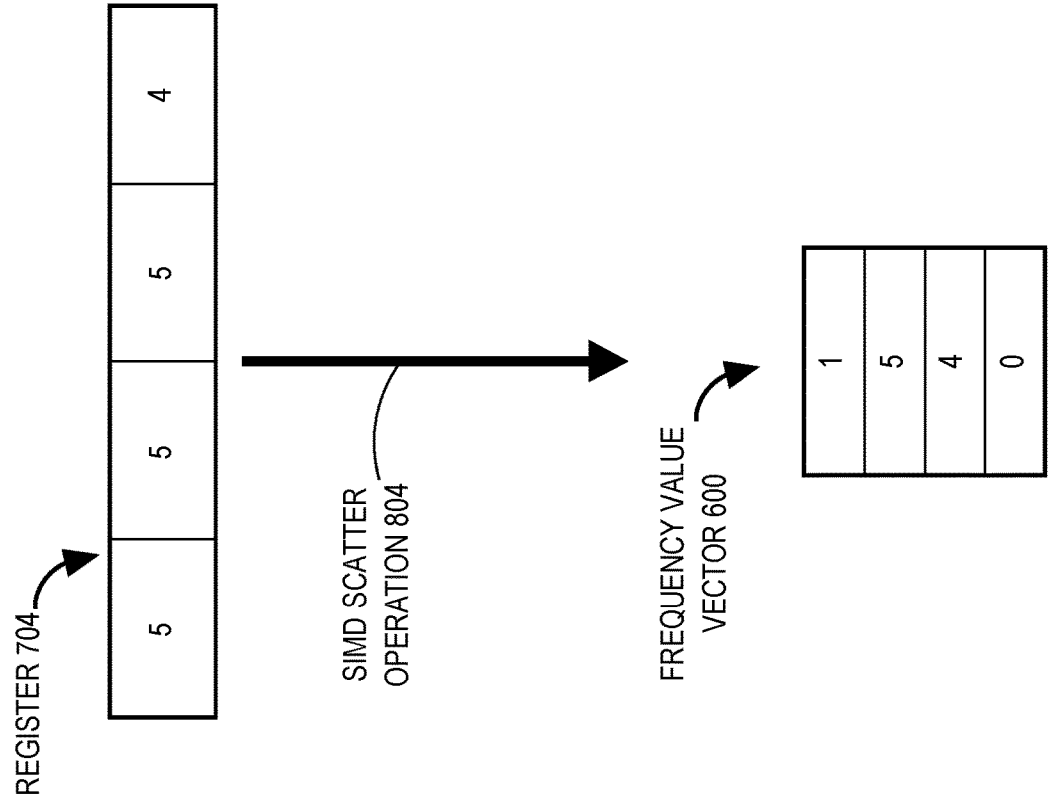
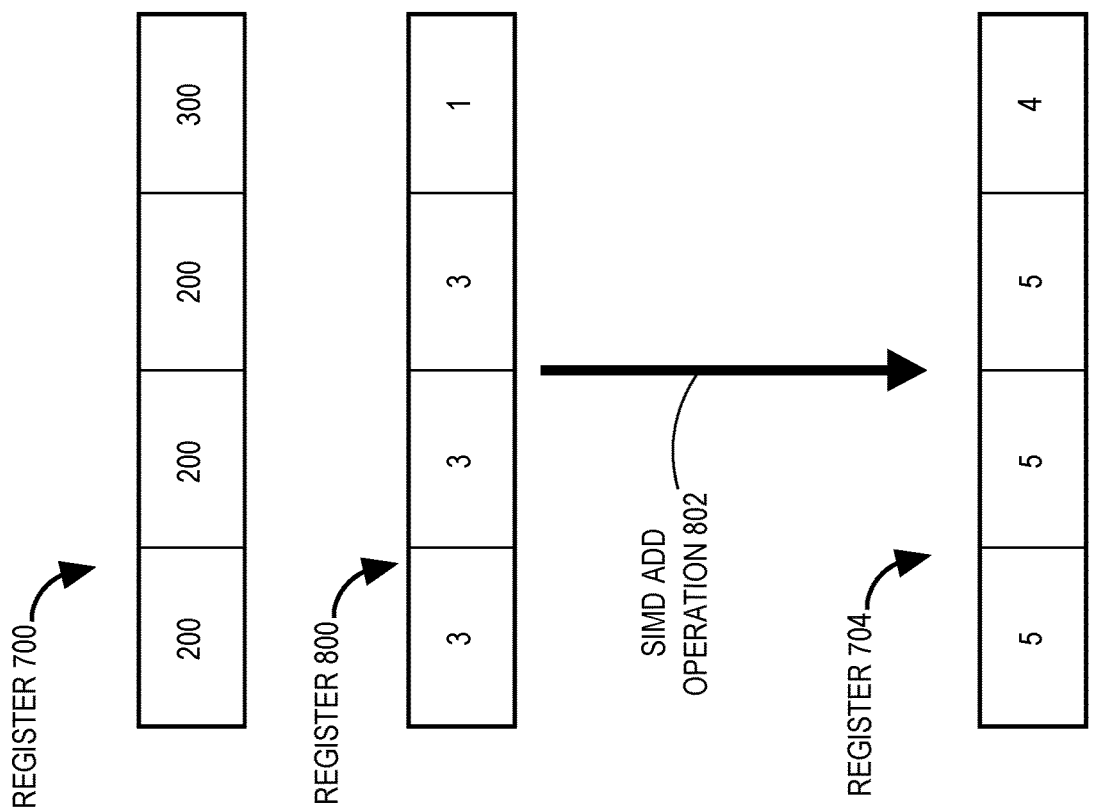

EFFICIENT EVALUATION OF QUERY EXPRESSIONS INCLUDING GROUPING CLAUSES

CROSS-REFERENCE TO RELATED APPLICATIONS; BENEFIT CLAIM

This application claims the benefit of Provisional Appln. 62/393,181, filed Sep. 12, 2016, the entire contents of which is hereby incorporated by reference as if fully set forth herein, under 35 U.S.C. § 119(e). This application is related to U.S. patent application Ser. No. 15/702,526 titled "EFFICIENT EVALUATION OF AGGREGATE FUNCTIONS" and U.S. patent application Ser. No. 15/702,431 titled "EFFICIENT EVALUATION OF QUERIES WITH MULTIPLE PREDICATE EXPRESSIONS", both of which are filed on the same day herewith, the entire contents of both of which are hereby incorporated by reference for all purposes as if fully set forth herein. This application is further related to Provisional Application No. 61/709,142 filed Oct. 2, 2012; U.S. patent application Ser. No. 14/023,064 filed Sep. 10, 2013; U.S. Pat. No. 9,697,174 issued Jul. 4, 2017; U.S. patent application Ser. No. 14/270,117 filed May 5, 2014; Provisional Application No. 61/801,207 filed Mar. 15, 2013, the entire contents of each of which are hereby incorporated by reference as if fully set forth herein.

TECHNICAL FIELD

Embodiments are generally related to information storage and retrieval technology. More specifically, embodiments are related to efficient evaluation of query expressions including grouping clauses.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Columnar Database Data

To enable efficient evaluation of database queries, database tables may be stored in a column-major format. Database tables stored in this way are referred to herein as "columnar database data". In column-major format, a column for a subset of rows in a database table are stored contiguously (within a memory address space) within a column vector. As used herein, a column vector refers to a vector that stores one or more values of a column. Referring to FIG. 1, database table 100 comprises columns 102-106. Column vectors 108-112 store all or part of columns 102-106, respectively.

In column-major format, a row of values spans across a set of column vectors. However, each of the values in the row have the same element position within a respective column vector of the set of column vectors. For example, the first row of database table 100 includes the values "10", "1", and "100" in columns 102-106, respectively. When database table 100 is represented as the set of column vectors 108-112, the values of the first row may be identified as the column values stored at index position "0" in each of column vectors 108, 110, and 112.

When the term "row" is used herein in reference to one or more column vectors, it may be referred to as a "column-major row". The term "row", when used herein in reference to a set of column vectors, refers to the set of column vector elements that have the same element position in each of the column vectors. Thus, the term "first row", when used in reference to column vectors 108, 110, and 112 together, refers to each of the column vector elements at index position "0". The term "row", when used herein in reference to a single column vector, refers to the column vector element corresponding to a particular row. Thus, the term "first row", when used in reference to column vector 108, refers to the column vector element at index "0" in column vector 108.

Columnar database data enables efficient processing of database data. Because the column values of a column are stored contiguously in memory, many kinds of database operations may be performed efficiently. For example, to evaluate a predicate based on a column, the column values may be retrieved more efficiently when stored contiguously in memory.

Compression

Typically, columnar database data is stored in a compressed format to conserve space in memory. Any number of various compression techniques may be used. Columnar database data may be stored inline with frequency values that can be used to compress and/or decompress the columnar database data. For example, run-length encoding is a lossless compression technique that can be used to store "AAAAA" as "5A", where the "5" indicates the length of the "run" of "A"s.

Additionally or alternatively, columnar data may be encoded using dictionary encoding. Dictionary encoding is a lightweight compression technique that enables data to be stored using a relatively small number of bits. The relatively small number of bits corresponds to an encoded representation of the data and is hereinafter referred to as a "token code" or simply "code". Encoding and decoding are enabled based on maintaining a dictionary, which maps codes to data and/or values represented by the codes and vice versa. As used herein, an encoding dictionary encodes a domain of values for a column, a part of a column, or a column vector. Unless otherwise indicated, when it is said that a dictionary is for/associated with/corresponds to a column/a part of a column/a column vector, the domain of values of the dictionary are the values in the column/the part of the column/the column vector.

Referring to FIG. 2, dictionary 200 corresponds to column vector 112. Dictionary 200 comprises codes 202 and represented data 204. Codes 202 correspond to the distinct values of column vector 112. Represented data 204 include decoded representations of these distinct values. In other words, dictionary 200 encodes a domain of values comprising represented data 204. For example, instead of storing "5000000", column vector 112 stores "100", thereby conserving space in memory. Although, for the sake of clarity and ease of explanation, represented data 204 is depicted as a small datatype having only seven significant digits, in reality, represented data 204 can be a very large datatype, such as ORACLE's number datatype, which can have up to thirty-eight significant digits.

Aggregate Functions

Many database queries involve aggregate functions for aggregating data stored in a particular column hereinafter referred to as a "measure" column. Examples of aggregate functions include min( ), max( ), distinct( ), sum( ), count( ), average( ), and/or the like.

When database data is maintained in row-major format, aggregate functions are typically evaluated one row at a time, which may entail performing a billion iterations of fetching and storing an entire row as well as extracting and performing a summation with a value in the row.

Aggregate functions may be performed more efficiently on database data when the database data is stored in column-major format. For column-major format data, although fetch and store operations of entire rows can be avoided, an aggregation operation may still be performed for each column value. However, any need to decompress data may result in slower performance. For example, performing a summation over a billion rows that each include encoded data may also involve a billion decoding operations.

Grouping Clauses

As used herein, "aggregate database queries" are database queries that include aggregate functions and grouping clauses specifying that database data is to be aggregated for groups of rows, each group being determined by the values in one or more columns. For each group of rows, an aggregate value (e.g., minimum, average, sum, etc.) is generated by applying an aggregate function to a measure column specified in an aggregate database query. A column by which rows are grouped by is referred to herein as a "grouping" column. For example, the query "SELECT SUM (column 106) FROM database table 100 GROUP BY column 104" aggregates values of measure column 106 for groups that are determined by different values of column 104. Referring back to FIG. 1, one group of rows includes the two rows that contain "2" in column 104. For these two rows, column 106 contains codes "300" and "100", which, according to dictionary 200, correspond to values "7000000" and "5000000", respectively. The aggregate value produced for this group would thus be 12000000.

Some grouping clauses specify an organization of database data by groups that are determined based on different combinations of values from multiple columns. To illustrate, if the grouping clause in the previous example had instead specified "GROUP BY column 102, column 104", each group would have been determined by different combinations of values from columns 102 and 104. For example, the value "100" of column 106 corresponds to the group identified by the combination of values "10" and "1". Thus, the value "100" is aggregated in a separate group from the value "200", which corresponds to the group identified by the combination of values "20" and "1".

Described herein are techniques for more efficiently aggregating column-major rows by groups determined based on values from multiple columns, where the column-major rows are compressed using dictionary compression.

BRIEF DESCRIPTION OF THE DRAWINGS

In the drawings:

FIG. 3A depicts an example approach for generating a set of grouping keys.
FIG. 3B depicts an example bit vector.
FIG. 4 depicts an example dense identifier mapping.
FIG. 5 is a flow diagram that depicts an example approach for aggregating a measure column vector according to a plurality of grouping column vectors.
FIG. 6 depicts an example approach for aggregating codes in a workspace based on frequency values.
FIG. 7A depicts an example single instruction, multiple data (SIMD) "load" operation.
FIG. 7B depicts an example SIMD "gather" operation.
FIG. 8A depicts an example SIMD "add" operation.
FIG. 8B depicts an example SIMD "scatter" operation.

Figure 1:
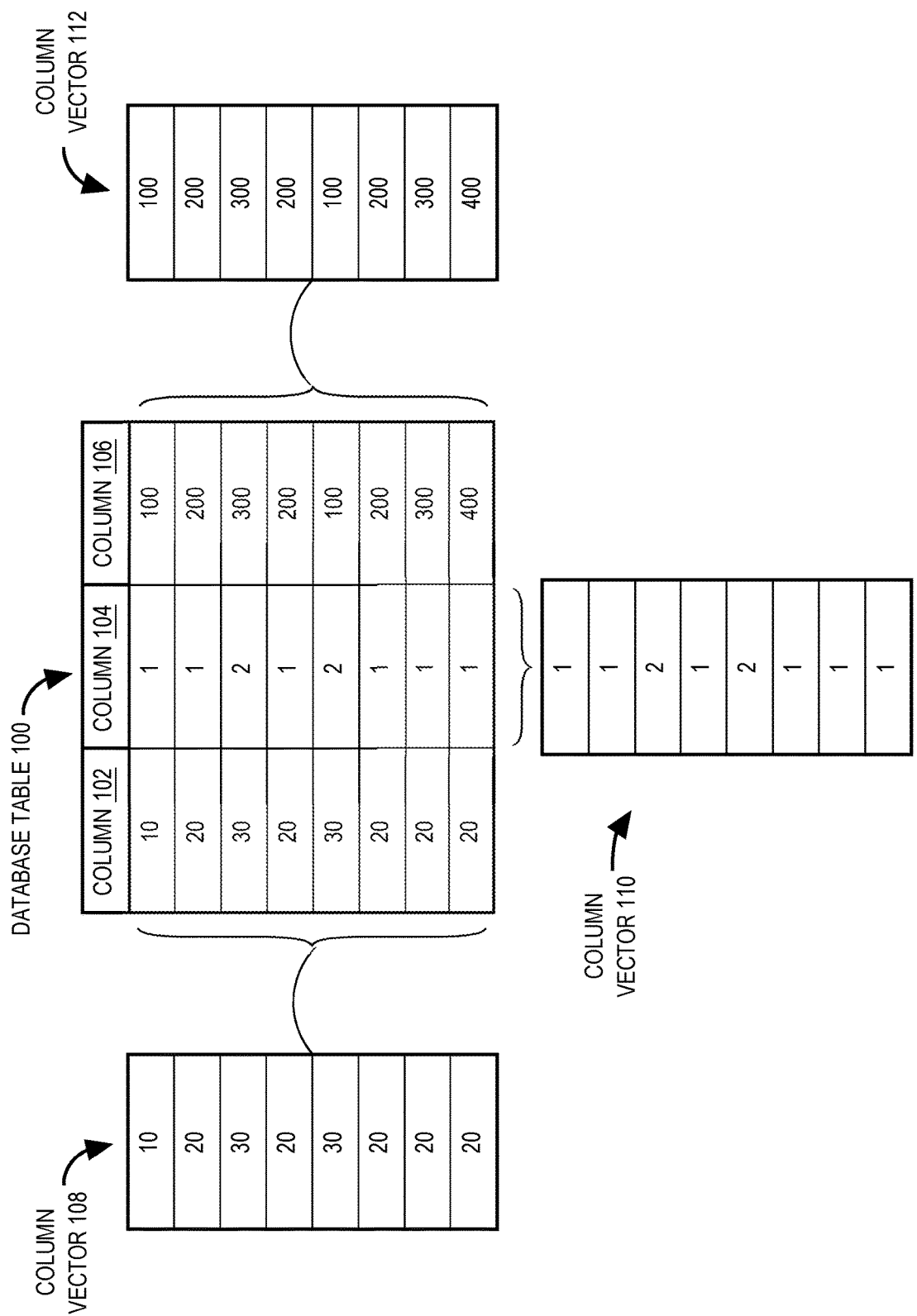
FIG. 1 depicts example columnar database data.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

Introduction

Embodiments relate to techniques for efficiently evaluating, over columnar database data, a query expression that includes a grouping clause. The query expression may include an aggregate function, such as sum( ), to be applied on a measure column. Additionally or alternatively, the grouping clause may specify a combination of grouping columns. For example, the query expression may include "SELECT SUM(column C) FROM table T GROUP BY column A, column B". This query specifies column C as a measure column and specifies column A and column B as grouping columns.

Efficiently evaluating aggregate functions may involve various techniques described herein that take advantage of column vectors that are compressed using dictionary compression. As mentioned before, a column vector compressed using dictionary compression contains elements that are codes. Such a column vector may be referred to herein as an encoded column vector. For the sake of clarity and ease of explanation, an encoded column vector may be simply referred to herein as a column vector. Some of the techniques described herein involve aggregating data in a measure column according to codes in a grouping column.

Grouping keys are used when evaluating a grouping clause over a combination of columns, each grouping key representing a different combination of codes by which one or more rows may be grouped. A grouping key may be a concatenation of codes from different column vectors. Thus, a grouping key does not need to include the actual values represented by the codes. A set of grouping keys that are used to represent combinations of codes may have a fixed size.

A grouping key for a set of column vectors may or may not represent a combination of codes that actually occurs in the set of column vectors. For example, if column vector A includes 1000 distinct consecutive codes and column vector B contains 1000 distinct consecutive codes, there are 1 million possible combinations. However, only some of the possible combinations actually co-occur in respective rows of the set of column vectors. Such combinations are referred to herein as "actual" combinations, and grouping keys that represent actual combinations are referred to herein as "actual" grouping keys. When aggregating data in groups of rows according to the different combinations of codes in the set of column vectors, aggregate values are generated only for the actual combinations that occur in the set of column vectors.

A set of grouping keys that includes all possible combinations of codes (i.e., both the actual combinations and the combinations that are not actual combinations) in a set of column vectors may be determined based on taking the Cartesian product of the codes in the set of column vectors. A set of grouping keys that only contains the actual combinations is referred to herein as a dense set of grouping keys.

Aggregating data for a grouping key requires allocating a workspace of memory ("workspace") for computing an aggregation result. Computing an aggregation result could involve applying, in a workspace, an aggregation function on one or more values of a measure column, such as to generate a running total for the sum( ) function. Alternatively, computing an aggregation result may involve storing, in a workspace, interim values over which an aggregate function is applied. For example, to compute the aggregate function avg( ), the results of computing sum( ) and count( ) may be stored in a workspace and based on these results, an average is computed in the workspace.

As mentioned above, a measure column stores values or codes representing values over which an aggregate function is to be applied. A column vector for a measure column is referred to herein as a measure column vector. A grouping column stores values or codes that are used, alone or in combination with the values or codes of another grouping column, to uniquely identify groups of rows. A column vector for a grouping column is referred to herein as a grouping column vector.

To perform aggregation operations that involve performing arithmetic operations on encoded measure column vectors (e.g., summation), codes must be decoded. In some embodiments, a workspace includes a vector ("workspace vector") that stores codes copied from a measure column vector. The codes in the workspace vector are decoded to enable performing arithmetic operations needed for aggregation. In some embodiments, the workspace further includes a vector ("frequency value vector") that stores frequency values, which indicate the number of times each distinct code occurs in the workspace vector. The frequency values enable minimizing the number of decoding operations that are performed.

For example, a group of rows in a measure column vector may include the set of codes {1, 4, 1, 4, 4}, and an encoding dictionary may indicate that the distinct codes "1" and "4" represent the decoded values "5,000,000" and "6,000,000", respectively. Computing an aggregation result for this group may be performed by tracking frequency values of the distinct codes. Thus, a frequency value vector is generated to indicate that "1" occurs twice and "4" occurs three times in a workspace vector storing the set of codes {1, 4, 1, 4, 4}. At a high level, tracking frequency values enables performing a multiplication operation instead of a multitude of addition operations. Thus, sum( ) may be efficiently evaluated based on the expression "2*1+3*4" instead of the expression "1+4+1+4+4", thereby reducing the number of addition operations involved. However, in reality, each frequency of occurrence is not multiplied to a respective code, but to the value represented by the code. Thus, sum( ) is actually evaluated based on the expression "2*5000000+3*6000000". Notably, maintaining a frequency value vector enables decoding "1" and "4" only once each instead of twice and three times, respectively.

Allocating a workspace for each grouping key in a Cartesian product set requires much more memory than allocating workspaces only for the actual grouping keys in the dense set, because the former approach allocates workspaces that are not used to aggregate data. To reduce memory requirements and increase memory utilization efficiency, techniques are described for allocating workspace only for the dense set of grouping keys.

Allocating workspaces only for the dense set of grouping keys requires identifying the actual grouping keys. Described herein are techniques for efficiently doing so.

Once the dense set of grouping keys is identified, each actual grouping key is associated with a dense identifier. As its name implies, a dense identifier is a denser representation of an actual grouping key. In other words, a dense identifier employs a smaller number of bits than a grouping key.

In addition, a dense identifier for a grouping key may be used to identify the memory location of a workspace associated with the dense identifier and the actual grouping key. For example, if each element of a single vector corresponds to a respective workspace, then dense identifiers for grouping keys may be used as indexes into an array or vector of workspaces.

To associate actual grouping keys with dense identifiers, a dense identifier mapping is generated. A dense identifier mapping indicates which grouping keys are actual grouping keys and maps the actual grouping keys to the dense identifiers.

Grouping Keys

Grouping keys may be generated in any of a variety of ways. In some embodiments, generating grouping keys involves concatenating bit representations of grouping column vector codes. For example, column A may have a code of "10" that corresponds to a code of "1" in column B. As used herein, codes/values of different columns that "correspond" with each other are codes/values that share a row in a database table. In this example, a grouping key for the combination of "10" and "1" would be "10100001", where "1010" and "0001" are the bit representations of "10" and "1", respectively. Notably, the order in which codes are concatenated is significant. For example, the grouping key for the combination of "1" and "10", which is completely different from the combination of "10" and "1", would be "00011010".

In some embodiments, generating grouping keys involves the formula A*|B|+B, where |B| is the cardinality of column B. Generally speaking, cardinality refers to the number of distinct elements in a set. In the context of columnar database data, cardinality refers to the number of distinct codes/values in a particular column or a subset thereof. Referring again to FIG. 2, column vector 112 has a cardinality of four, because column vector 112 includes four distinct codes: "100", "200", "300", and "400".

Figure 2:
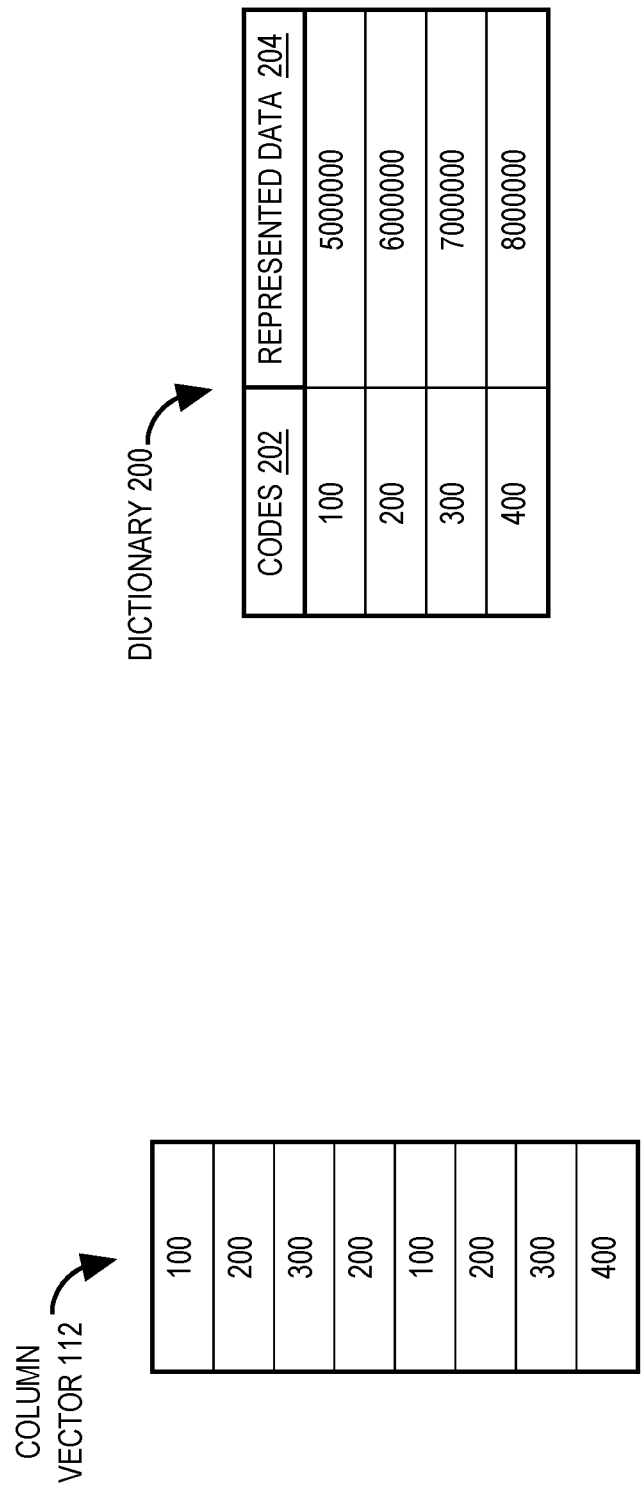
FIG. 2 depicts an example encoding dictionary.

Cardinality may be determined based on evaluating the aggregate function distinct( ) over a particular column or a subset thereof. However, a more efficient approach for determining cardinality may involve referring to an encoding dictionary. Referring to FIG. 2, dictionary 200 corresponds to column vector 112. Dictionary 200 has four entries, thereby indicating that column vector 112 has a cardinality of four.

FIG. 3A depicts an example set of grouping keys that is generated based on the aforementioned formula. Set of grouping keys 302 is generated based on applying the aforementioned formula to the codes of column vectors 108-110. Notably, column vector 110 has a cardinality of two. Thus, each code of column vector 108 is doubled before being added to a respective code of column vector 110.

Significantly, it is unnecessary to decompress codes when generating grouping keys. For example, concatenation of bit representations or application of the aforementioned formula may be performed directly on dictionary-encoded values, thereby avoiding the computational overhead of decompression. Thus, grouping keys may be generated while concurrently scanning multiple column vectors.

In the example of FIG. 3A, set of grouping keys 302 has a size that corresponds to the size of column vector 108 or column vector 110. Set of grouping keys 302 may be generated while concurrently scanning column vectors 108-110. However, set of grouping keys 302 may include duplicates of some grouping keys. For example, five instances of the grouping key "20*2+1" are included in set 302.

Bit Vectors

As mentioned before, the actual combinations in a Cartesian product set that occur in a set of grouping column vectors must be identified. According to an embodiment, the actual combinations are identified based on generating a bit vector that indicates which combinations actually occurred in the set of grouping column vectors. The bit vector also indicates the number of distinct combinations that actually occurred in the set of grouping column vectors. This enables avoiding allocation of unnecessary workspaces, such as multiple workspaces that are allocated to the same grouping key.

FIG. 3B depicts an example bit vector. Bit vector 304 has a size that corresponds to the Cartesian product of the distinct codes of column vectors 108-110. More specifically, column vector 108 stores the distinct codes "10", "20", and "30", whereas column vector 110 stores the distinct codes "1" and "2". Thus, bit vector 304 stores six bits-one for each of the following combinations: "10" and "1"; "10" and "2"; "20" and "1"; "20" and "2"; "30" and "1"; and "30" and "2". In some embodiments, the distinct codes of a column vector are obtained based on scanning an encoding dictionary that corresponds to the column vector.

Column vectors 108-110 may be concurrently scanned to determine which combinations of codes occur in the grouping column vectors. For each combination of codes, if a respective bit in bit vector 304 is unset, the bit is set to indicate that the combination of codes occurs in column vectors 108-110. In the example of FIG. 3B, bit vector 304 has three bits that are set, thereby indicating that there are three distinct grouping keys: "10*2+1", "20*2+1", and "30*2+2".

Each of these three distinct grouping keys is mapped to a unique workspace identifier, which may be a dense identifier. This may involve generating a sparse vector like the one depicted in FIG. 4 to store a respective dense identifier for each actual grouping key indicated by the set bits of bit vector 304 and thereby determine a set of dense identifiers for the actual grouping keys. Notably, grouping-key-to-workspace-ID mapping 400 is a sparse vector in that not all grouping keys correspond to a workspace identifier. In the example of FIG. 4, the grouping keys that do not actually occur in column vectors 108-110 have a NULL value where a workspace identifier would have been stored. Since there are three distinct actual grouping keys, only three workspaces are necessary. Thus, grouping-key-to-workspace-ID mapping 400 only stores three workspace identifiers, which correspond to the number of distinct grouping keys determined using bit vector 304.

Workspace identifiers may be assigned in any of a variety of ways. For example, workspace identifiers may be consecutive integers that are assigned based on the order in which the distinct grouping keys are encountered in bit vector 304 and/or set of grouping keys 302. In some embodiments, instead of storing workspace identifiers, mapping 400 stores pointers to workspaces 404-408.

Workspaces

A workspace may include one or more vectors that are allocated for evaluating an aggregate function for a particular group of codes. Each workspace identifier may be stored with a pointer to a respective workspace. Referring to FIG. 4, workspace vectors 404-408 correspond to workspace identifiers "1", "2", and "3", respectively.

Codes that are to be aggregated may be loaded into workspace vectors according to groups identified by corresponding grouping keys. In the example of FIG. 4, codes of column vector 112 are loaded into workspace vectors 404-408 based on corresponding combinations of codes of column vectors 108-110. An aggregate function may be evaluated over the codes in each workspace vector using any number of various techniques that take advantage of the column-major format used to contiguously store codes.

In some embodiments, aggregating a set of one or more codes in a workspace vector involves accumulating a running sum of the one or more values represented by the codes in the workspace vector. For example, instead of storing five codes, workspace vector 406 would store only one value that is a cumulative sum of the values represented by the five codes. The cumulative sum may be generated while scanning column vector 112 and dictionary 200 for values corresponding to the grouping key "20*2+1". Thus, workspace vector 406 may store "6000000", then replace "6000000" with "12000000", then replace "12000000" with "18000000", and so forth.

In some embodiments, to avoid decoding the same code multiple times, aggregating a set of one or more codes in a workspace vector involves leveraging a respective frequency value of each distinct code having multiple instances in the workspace vector. Thus, this technique enables efficient aggregation over a workspace vector that stores duplicate codes. For example, if a workspace vector stores the codes "100", "200", "200", "100", and "200", simply adding the values represented by these codes would involve n decompressions and n−1 addition operations, where n is the number of codes stored in the workspace vector. In contrast, leveraging frequency values would reduce the number of decompressions to m as well as reduce the number of addition operations to m−1, where m is the number of distinct codes in the workspace vector. In other words, the expression "5000000+6000000+6000000+5000000+6000000" would be more efficiently evaluated as "2*5000000+3*6000000", where "2" and "3" are the frequency values of "5000000" and "6000000", respectively. However, this technique may involve generating a frequency value vector for storing a respective cumulative frequency value for each distinct code in the workspace vector.

Process Overview

FIG. 5 depicts an example process for aggregating a measure column vector according to a plurality of grouping column vectors where the measure column vector and the plurality of grouping column vectors are encoded column vectors. Blocks 500-504 describe a process for generating data structures that enable aggregating the measure column vector according to the plurality of grouping column vectors. Blocks 506-510 describe a process for using the generated data structures for aggregating the measure column vector according to the plurality of grouping column vectors.

At block 500, a plurality of actual grouping keys is determined based on scanning the plurality of grouping column vectors for occurrences of grouping keys. In some embodiments, a bit vector (e.g., bit vector 304) is used to keep track of the actual grouping keys.

At block 502, a dense identifier mapping (e.g., mapping 400) is generated. The dense identifier mapping respectively maps the plurality of actual grouping keys to a plurality of dense identifiers. Each dense identifier of the plurality of dense identifiers corresponds to a respective workspace of a plurality of workspaces.

Generating the dense identifier mapping may involve determining the plurality of dense identifiers based on assigning a respective dense identifier to each actual grouping key indicated by the set bits of the bit vector described for block 500. In some embodiments, the dense identifier mapping is a sparse vector (e.g., mapping 400) that stores the plurality of dense identifiers.

At block 504, the plurality of workspaces are allocated. As mentioned above, each workspace corresponds to a respective dense identifier, which is mapped to an actual grouping key. Thus, in each workspace, an aggregate function is applied to one or more codes of the measure column vector that correspond to the actual grouping key for the workspace.

At block 506, a particular grouping key is generated for a particular row of the measure column vector and the plurality of grouping column vectors. The particular grouping key is generated based on codes in the plurality of grouping column vectors, which includes at least a first grouping column vector and a second grouping column vector.

In some embodiments, the particular grouping key is generated based on a predetermined formula, such as A*|B|+B. Thus, a first code in the particular row of the first grouping column vector is multiplied to a cardinality value of the second grouping column vector to generate a product component of the particular grouping key. The product component is then added to a second code in the particular row of the second grouping column vector to complete generation of the particular grouping key.

In some embodiments, the particular grouping key is generated based on concatenating a first code in the particular row of the first grouping column vector with a second code in the particular row of the second grouping column vector. For example, if the first code is "1" and the second code is "2", the particular grouping key would be "12".

At block 508, the particular grouping key is determined to be mapped to a particular dense identifier. This may be performed based on referring to the dense identifier mapping describe at block 502.

At block 510, a particular workspace is updated based on a particular code of the measure column vector. The particular workspace corresponds to the particular dense identifier.

In some embodiments, updating the particular workspace involves accumulating, into the particular workspace, a value represented by the particular code. For example, the particular workspace may store a running sum that is iteratively updated with decoded values that are added to the running sum.

In some embodiments, updating the particular workspace involves storing, in a workspace vector of the particular workspace, the particular code of the measure column vector. When all the codes for the particular workspace have been stored in the workspace vector, an aggregation may be performed over the workspace vector using any of the techniques described herein, including the techniques described below.

Frequency Value Vector

In some embodiments, a workspace includes a workspace vector and a frequency value vector. Referring to FIG. 6, frequency value vector 600 stores frequency values 602-606 corresponding to the distinct codes "200", "300", and "400", respectively, of workspace vector 406. Frequency value vector 600 may be indexed to the entries of an encoding dictionary. In the example of FIG. 6, frequency value vector 600 is indexed to dictionary 200, which is an encoding dictionary for column vector 112. Any distinct code absent from workspace vector 406 corresponds to a frequency value of "0" in frequency value vector 600.

Each frequency value indicates a respective number of instances of a corresponding code in the workspace vector. Referring to FIG. 6, frequency value 602 indicates that the code "200" appears three times in workspace vector 406, and frequency values 604-606 indicate that the codes "300" and "400" each appear once in workspace vector 406. In some embodiments, frequency values are initialized to "0" and updated as the workspace vector is scanned.

Thus, to aggregate the codes in the workspace vector, each frequency value is multiplied to a respective distinct code of the workspace vector to generate a product. In some embodiments, generating products involves decompressing the distinct codes of the workspace. Referring to FIG. 6, frequency value 602 is multiplied to "6000000", frequency value 604 is multiplied to "7000000", and frequency value 606 is multiplied to "8000000".

Notably, leveraging frequency values enables minimizing decompression such that each distinct code of the workspace vector is decompressed only once. For example, a less efficient approach for performing a summation over workspace vector 406 would involve five decompressions-one decompression for each of the five codes "200", "200", "200", "300", and "400". In contrast, frequency value vector 600 enables reducing the number of decompressions to three-one for each of the three distinct codes "200", "300", and "400". In some embodiments, a bit mask may be used to decompress only the distinct codes that correspond to non-zero frequency values.

An approach that leverages frequency values also involves aggregating the generated products. For example, the generated products may be stored in yet another vector in the workspace, and a summation may be performed over the generated products in the vector. In some embodiments, the summation may be performed using any number of the various techniques described herein.

SIMD Instruction Set

As mentioned above, an approach that leverages frequency values may involve generating a frequency value vector. In some embodiments, a frequency value vector is efficiently generated based on parallelization techniques, such as SIMD operations. Iterations of SIMD operations are especially useful for quickly generating a frequency value vector for a large number of codes. FIGS. 7A-B and 8A-B depict an example iteration involving four SIMD operations: "load", "gather", "add", and "scatter". Notably, the SIMD "scatter" operation is an instruction in INTEL's AVX-512 instruction set.

The SIMD "load" operation is used to store at least a subset of a particular vector into a first register. The particular vector may be any vector over which a summation is to be performed, and each subset includes as many codes as will fit into the first register. Referring to FIG. 7A, register 700 can accommodate up to four codes at a time. There are more than four codes in workspace vector 406, so in this particular iteration, SIMD load operation 702 concurrently loads four of the codes into register 700 and leaves the remaining code of workspace vector 406 for a subsequent iteration.

The SIMD "gather" operation is used to store running frequency values into a second register. The running frequency values are fetched from a frequency value vector. For a particular iteration, each running frequency value that is fetched corresponds to a respective code stored in the first register. Referring to FIG. 7B, frequency value vector 600 stores the running frequency values 708-710, which respectively correspond to the distinct codes "200" and "300" stored in register 700. For the sake of clarity and ease of explanation, arbitrary numbers have been assigned to frequency values 708-710 for this toy example. SIMD gather operation 706 stores frequency value 708 in the first three portions of register 704 and stores frequency value 710 in the last portion of register 704 such that the relative position of each frequency value in register 704 corresponds to the relative position of a respective value in register 700.

The SIMD "add" operation is used to update one or more running frequency values in the second register. In some embodiments, the second register is updated based on a third register that stores a respective frequency value for each code loaded into the first register. Thus, the one or more running frequency values in the second register may be updated based on adding them to one or more frequency values in the third register.

Referring to FIG. 8A, register 800 stores a respective frequency value for each code of register 700. In other words, the frequency value "3" corresponds to the code "200", and the frequency value "1" corresponds to the code "300". SIMD add operation 802 updates register 704 with the frequency values of register 800. Thus, the frequency values "3", "3", "3", and "1" are added to the running frequency values "2", "2", "2", and "3" to generate the updated running frequency values "5", "5", "5", and "4".

In some embodiments, the frequency values are determined based on scanning register 700. In some embodiments, the codes of register 700 are run-length encoded, so each code may include a value that is preceded by a run-length that can be stored in register 800 as a frequency value. In some embodiments, run-length encoded values of register 700 may be expanded out and traversed to compute frequency values.

Referring to FIG. 8A, register 800 stores the same frequency value "3" for each instance of the code "200" in register 700. As will be described below, this enables concurrency without affecting consistency.

The SIMD "scatter" operation stores the updated running frequency values into the frequency value vector. Referring to FIG. 8B, SIMD scatter operation 804 takes the updated running frequency values of register 704 and stores them in frequency value vector 600. Although register 800 stores three instances of the frequency value "5", frequency value vector 600 stores only one instance of the frequency value "5". However, because the three instances of the frequency value "5" in register 800 are identical, the three instances may be stored in frequency value vector 600 in any order, thereby avoiding a race condition.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
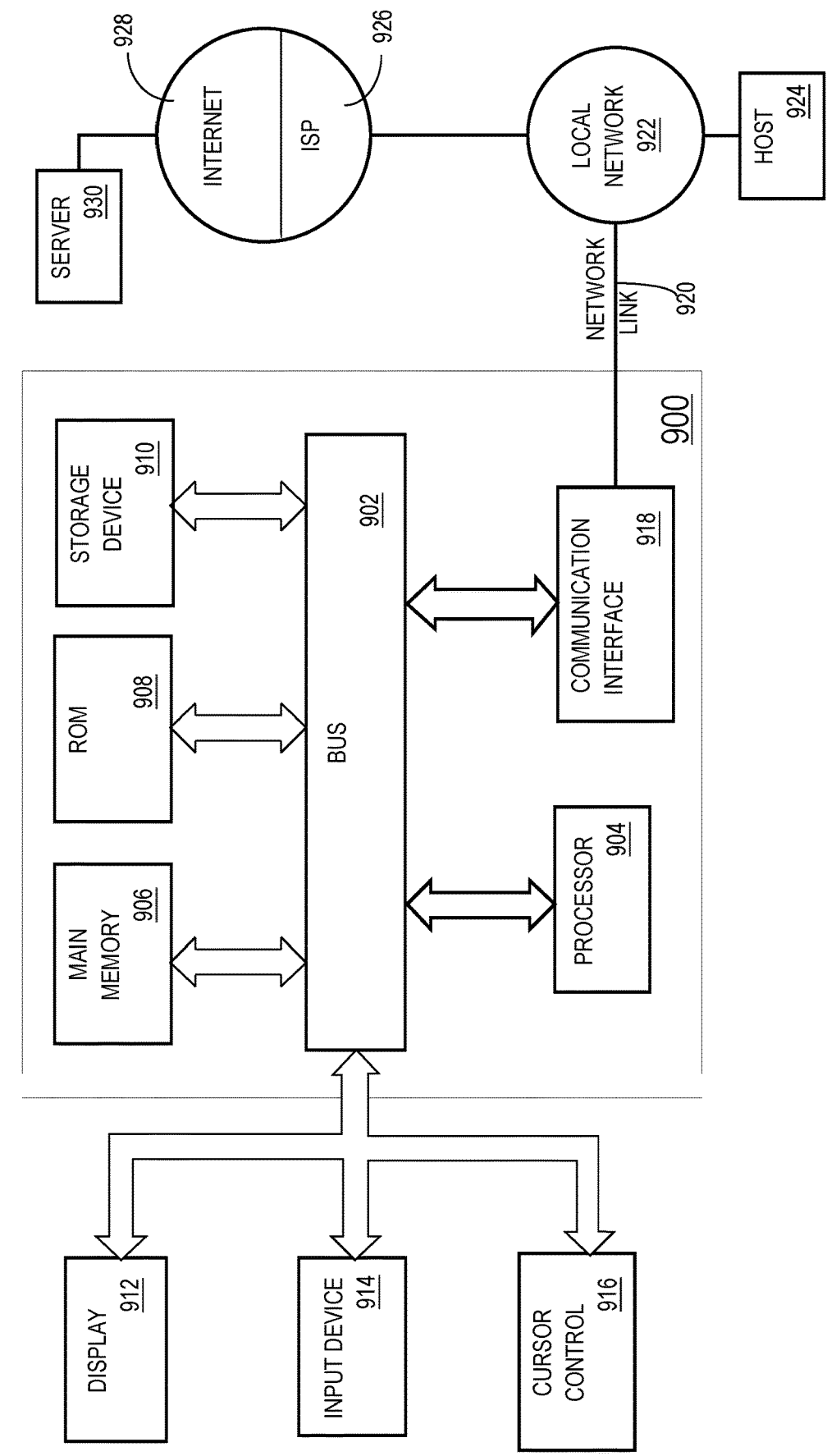
FIG. 9 depicts a computer system upon which embodiments may be implemented.

For example, FIG. 9 is a block diagram that illustrates a computer system 900 upon which an embodiment of the disclosure may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
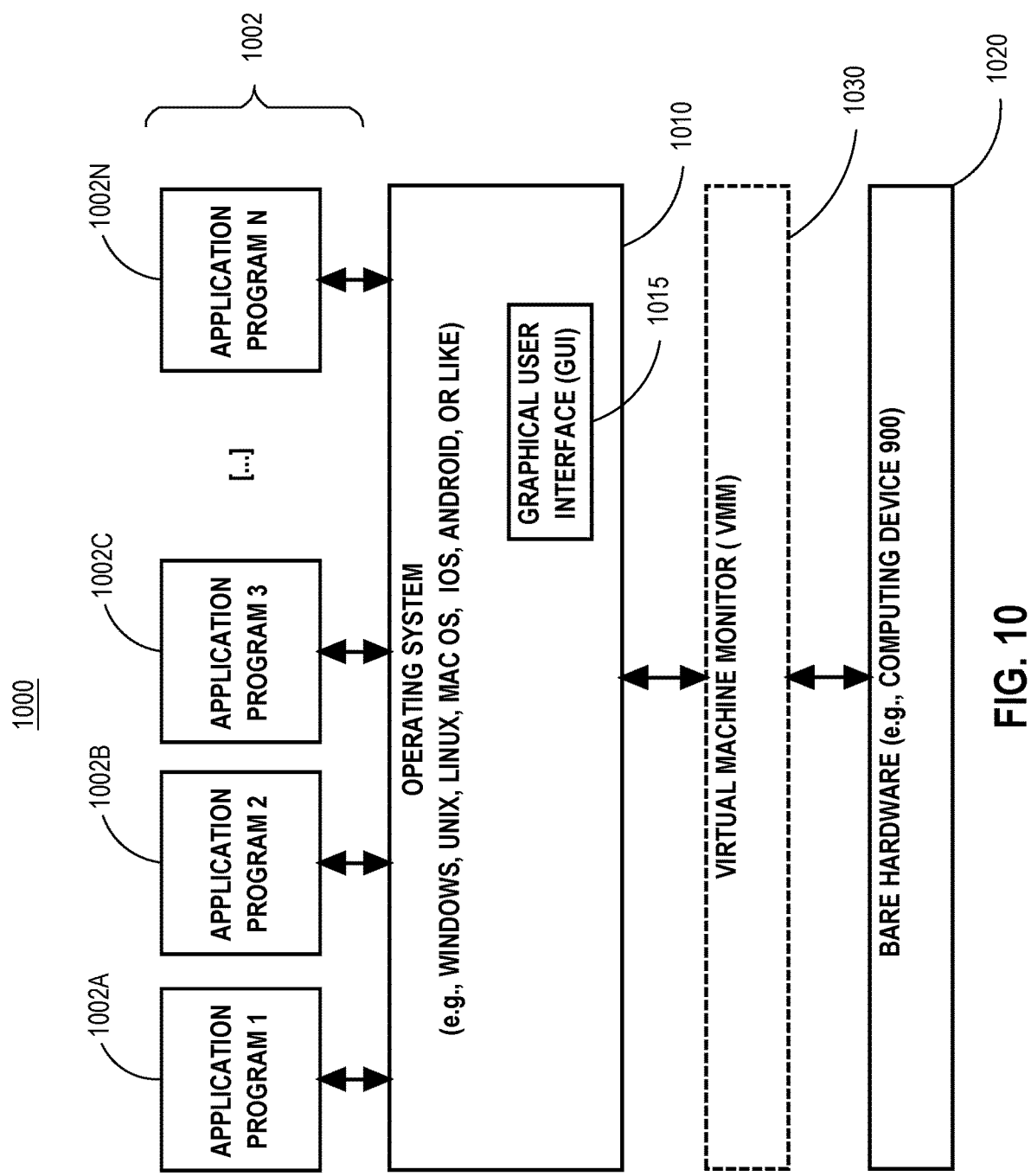
FIG. 10 depicts a software system for controlling the operation of the computer system.

FIG. 10 is a block diagram of a software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 900. The applications or other software intended for use on system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of system 1000. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for aggregating a measure column vector according to a plurality of grouping column vectors, said measure column vector and each of said plurality of grouping column vectors being encoded column vectors, the method comprising:
   determining a plurality of actual grouping keys, each actual grouping key occurring in said plurality of grouping column vectors;
   generating a dense identifier mapping that maps said plurality of actual grouping keys to a plurality of dense identifiers, wherein said dense identifier mapping maps each actual grouping key of said plurality of actual grouping keys to a respective dense identifier of said plurality of dense identifiers;

wherein each dense identifier of said plurality of dense identifiers corresponds to a respective workspace of a plurality of workspaces;

wherein aggregating said measure column vector according to said plurality of grouping column vectors includes aggregating, in each workspace of said plurality of workspaces, one or more codes of said measure column vector that correspond to an actual grouping key mapped to a dense identifier corresponding to said each workspace;

wherein, for a first row of said measure column vector and said plurality of grouping column vectors, aggregating said one or more codes includes:
generating a particular grouping key based on codes in said plurality of grouping column vectors;
determining that said particular grouping key is mapped to a particular dense identifier; and
updating a particular workspace that corresponds to said particular dense identifier based on a particular code of said measure column vector, wherein the method is performed by one or more computing devices.

2. The method of claim 1, wherein determining said plurality of actual grouping keys comprises:
generating a bit vector having a size that corresponds to a Cartesian product of distinct codes in said plurality of grouping column vectors;
scanning said plurality of grouping column vectors to determine which combinations of distinct codes occur in said plurality of grouping column vectors;
setting bits in said bit vector that correspond to said combinations of distinct codes that occur in said plurality of grouping column vectors.

3. The method of claim 2, wherein generating said dense identifier mapping comprises determining said plurality of dense identifiers based on assigning a respective dense identifier for each actual grouping key indicated by said bits set in said bit vector.

4. The method of claim 1, wherein generating said particular grouping key based on said codes in said plurality of grouping column vectors comprises:
multiplying a first code in said first row of a first grouping column vector to a cardinality value of a second grouping column vector to generate a product component of said particular grouping key, wherein said plurality of grouping column vectors comprises said first grouping column vector and said second grouping column vector;
adding said product component to a second code in said first row of said second grouping column vector.

5. The method of claim 1, wherein generating said particular grouping key based on said codes in said plurality of grouping column vectors comprises concatenating a first code in said first row of a first grouping column vector with a second code in said first row of a second grouping column vector, wherein said plurality of grouping column vectors comprises said first grouping column vector and said second grouping column vector.

6. The method of claim 1, wherein generating said dense identifier mapping comprises storing said plurality of dense identifiers in a sparse vector.

7. The method of claim 1, wherein updating said particular workspace that corresponds to said particular dense identifier based on said particular code of said measure column vector comprises accumulating, into said particular workspace, a value represented by said particular code to generate a running sum.

8. The method of claim 1, wherein updating said particular workspace that corresponds to said particular dense identifier based on said particular code of said measure column vector comprises:
storing, in a workspace vector of said particular workspace, said particular code of said measure column vector;
performing an aggregation over said workspace vector.

9. The method of claim 8, wherein performing said aggregation over said workspace vector comprises:
storing, in a frequency value vector, a respective frequency value for each distinct code of said workspace vector, wherein a frequency value indicates a number of instances of a particular code in said workspace vector;
generating a set of one or more products based on multiplying, to a corresponding frequency value of said frequency value vector, a respective value represented by each distinct code of said workspace vector;
performing a summation over said set of one or more products.

10. The method of claim 9, wherein storing, in said frequency value vector, a respective frequency value for each distinct code of said workspace vector comprises:
performing a single instruction, multiple data (SIMD) load operation that loads, into a first register, multiple codes of said workspace vector;
performing a SIMD gather operation that retrieves, into a second register, a respective running frequency value for each code of said multiple codes loaded into said first register;
performing a SIMD add operation that updates one or more running frequency values in said second register with one or more frequency values for said multiple codes loaded into said first register;
performing a SIMD scatter operation that stores, in said frequency value vector, said one or more running frequency values updated in said second register.

11. One or more non-transitory storage media storing a sequence of instructions which, when executed by one or more computing devices, cause performance of a method for aggregating a measure column vector according to a plurality of grouping column vectors, said measure column vector and each of said plurality of grouping column vectors being encoded column vectors, the method comprising:
determining a plurality of actual grouping keys, each actual grouping key occurring in said plurality of grouping column vectors;
generating a dense identifier mapping that maps said plurality of actual grouping keys to a plurality of dense identifiers, wherein said dense identifier mapping maps each actual grouping key of said plurality of actual grouping keys to a respective dense identifier of said plurality of dense identifiers;
wherein each dense identifier of said plurality of dense identifiers corresponds to a respective workspace of a plurality of workspaces;
wherein aggregating said measure column vector according to said plurality of grouping column vectors includes aggregating, in each workspace of said plurality of workspaces, one or more codes of said measure column vector that correspond to an actual grouping key mapped to a dense identifier corresponding to said each workspace;
wherein, for a first row of said measure column vector and said plurality of grouping column vectors, aggregating said one or more codes includes:

generating a particular grouping key based on codes in said plurality of grouping column vectors;

determining that said particular grouping key is mapped to a particular dense identifier; and updating a particular workspace that corresponds to said particular dense identifier based on a particular code of said measure column vector.

12. The one or more non-transitory storage media of claim 11, wherein determining said plurality of actual grouping keys comprises:

generating a bit vector having a size that corresponds to a Cartesian product of distinct codes in said plurality of grouping column vectors;

scanning said plurality of grouping column vectors to determine which combinations of distinct codes occur in said plurality of grouping column vectors;

setting bits in said bit vector that correspond to said combinations of distinct codes that occur in said plurality of grouping column vectors.

13. The one or more non-transitory storage media of claim 12, wherein generating said dense identifier mapping comprises determining said plurality of dense identifiers based on assigning a respective dense identifier to each actual grouping key indicated by said bits set in said bit vector.

14. The one or more non-transitory storage media of claim 11, wherein generating said particular grouping key based on said codes in said plurality of grouping column vectors comprises:

multiplying a first code in said first row of a first grouping column vector to a cardinality value of a second grouping column vector to generate a product component of said particular grouping key, wherein said plurality of grouping column vectors comprises said first grouping column vector and said second grouping column vector;

adding said product component to a second code in said first row of said second grouping column vector.

15. The one or more non-transitory storage media of claim 11, wherein generating said particular grouping key based on said codes in said plurality of grouping column vectors comprises concatenating a first code in said first row of a first grouping column vector with a second code in said first row of a second grouping column vector, wherein said plurality of grouping column vectors comprises said first grouping column vector and said second grouping column vector.

16. The one or more non-transitory storage media of claim 11, wherein generating said dense identifier mapping comprises storing said plurality of dense identifiers in a sparse vector.

17. The one or more non-transitory storage media of claim 11, wherein updating said particular workspace that corresponds to said particular dense identifier based on said particular code of said measure column vector comprises accumulating, into said particular workspace, a value represented by said particular code to generate a running sum.

18. The one or more non-transitory storage media of claim 11, wherein updating said particular workspace that corresponds to said particular dense identifier based on said particular code of said measure column vector comprises:

storing, in a workspace vector of said particular workspace, said particular code of said measure column vector;

performing an aggregation over said workspace vector.

19. The one or more non-transitory storage media of claim 18, wherein performing said aggregation over said workspace vector comprises:

storing, in a frequency value vector, a respective frequency value for each distinct code of said workspace vector, wherein a frequency value indicates a number of instances of a particular code in said workspace vector;

generating a set of one or more products based on multiplying, to a corresponding frequency value of said frequency value vector, a respective value represented by each distinct code of said workspace vector;

performing a summation over said set of one or more products.

20. The one or more non-transitory storage media of claim 19, wherein storing, in said frequency value vector, a respective frequency value for each distinct code of said workspace vector comprises:

performing a single instruction, multiple data (SIMD) load operation that loads, into a first register, multiple codes of said workspace vector;

performing a SIMD gather operation that retrieves, into a second register, a respective running frequency value for each code of said multiple codes loaded into said first register;

performing a SIMD add operation that updates one or more running frequency values in said second register with one or more frequency values for said multiple codes loaded into said first register;

performing a SIMD scatter operation that stores, in said frequency value vector, said one or more running frequency values updated in said second register.

* * * * *

UNITED STATES PATENT AND TRADEMARK OFFICE
CERTIFICATE OF CORRECTION

PATENT NO. : 10,853,371 B2
APPLICATION NO. : 15/702659
DATED : December 1, 2020
INVENTOR(S) : Chavan et al.

It is certified that error appears in the above-identified patent and that said Letters Patent is hereby corrected as shown below:

On the Title Page

Item (72), under Inventors, Line 4, delete "Jallisco" and insert -- Jalisco --, therefor.

On page 2, Column 2, Item (56), under Other Publications, Line 3, delete "Quries" and insert -- Queries --, therefor.

In the Claims

In Column 16, Line 60, in Claim 1, after "key" insert -- of said plurality of actual grouping keys --.

In Column 17, Line 9, in Claim 1, after "key" insert -- of said plurality of actual grouping keys that is --.

In Column 17, Line 9, in Claim 1, delete "corresponding" and insert -- of said plurality of dense identifiers that corresponds --, therefor.

In Column 17, Line 17, in Claim 1, delete "identifier;" and insert -- identifier of said plurality of dense identifiers; --, therefor.

In Column 17, Line 37, in Claim 3, after "key" insert -- of said plurality of actual grouping keys that is --.

In Column 18, Line 41, in Claim 11, after "cause" delete "performance of a method for".

In Column 18, Line 45, in Claim 11, delete "vectors, the method comprising:" and insert -- vectors by at least: --, therefor.

In Column 18, Line 47, in Claim 11, after "key" insert -- of said plurality of actual grouping keys --.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,853,371 B2

In Column 18, Line 63, in Claim 11, after "key" insert -- of said plurality of actual grouping keys that is --.

In Column 19, Line 23, in Claim 13, after "key" insert -- of said plurality of actual grouping keys that is --.